(12) United States Patent
Husain et al.

(10) Patent No.: US 12,447,614 B2
(45) Date of Patent: Oct. 21, 2025

(54) LEARNING FROM DEMONSTRATION FOR DETERMINING ROBOT PERCEPTION MOTION

(71) Applicant: GDM Holding LLC, Mountain View, CA (US)

(72) Inventors: Ammar Husain, San Francisco, CA (US); Mikael Persson, Sunnyvale, CA (US)

(73) Assignee: GDM Holding LLC, Mountain View, CA (US)

( * ) Notice: Subject to any disclaimer, the term of this patent is extended or adjusted under 35 U.S.C. 154(b) by 113 days.

(21) Appl. No.: 17/932,271

(22) Filed: Sep. 14, 2022

(65) Prior Publication Data

US 2023/0084774 A1 Mar. 16, 2023

Related U.S. Application Data

(60) Provisional application No. 63/244,902, filed on Sep. 16, 2021.

(51) Int. Cl.
*B25J 19/02* (2006.01)
*B25J 9/16* (2006.01)

(52) U.S. Cl.
CPC ............ *B25J 9/1664* (2013.01); *B25J 9/161* (2013.01); *B25J 9/163* (2013.01); *B25J 9/1689* (2013.01); *B25J 19/021* (2013.01)

(58) Field of Classification Search
CPC . B25J 9/1664; B25J 9/161; B25J 9/163; B25J 9/1689; B25J 19/021; B25J 9/162;

(Continued)

(56) References Cited

U.S. PATENT DOCUMENTS 9,120,227 B2 9/2015 Zheng et al.
9,321,176 B1 4/2016 Sun et al.
(Continued)

FOREIGN PATENT DOCUMENTS

WO 2018/156952 8/2018
WO 2022012265 1/2022

OTHER PUBLICATIONS

Echegoyen et al., "Visual Servoing of Legged Robots," Journal of Mathematical Imaging and Vision, Apr. 29, 2011, pp. 196-211, vol. 42, No. 2-3.

(Continued)

*Primary Examiner* — Adam R Mott
*Assistant Examiner* — Heather J Keniry
(74) *Attorney, Agent, or Firm* — McDonnell Boehnen Hulbert & Berghoff LLP

(57) ABSTRACT

A method includes determining, for a robotic device that comprises a perception system, a robot planner state representing at least one future path for the robotic device in an environment. The method also includes determining a perception system trajectory by inputting at least the robot planner state into a machine learning model trained based on training data comprising at least a plurality of robot planner states corresponding to a plurality of operator-directed perception system trajectories. The method further includes controlling, by the robotic device, the perception system to move through the determined perception system trajectory.

20 Claims, 14 Drawing Sheets

(58) Field of Classification Search
CPC ......... B25J 9/1697; G05B 2219/35145; G05B 2219/40391; G05B 2219/40452
See application file for complete search history.

(56) References Cited

U.S. PATENT DOCUMENTS

| | | | |
|---|---|---|---|
| 2011/0276396 A1* | 11/2011 | Rathod | H04L 51/48 |
| | | | 707/706 |
| 2017/0193298 A1 | 7/2017 | Versace et al. | |
| 2017/0357270 A1 | 12/2017 | Russell et al. | |
| 2018/0104816 A1* | 4/2018 | Tokuchi | B25J 9/1679 |
| 2018/0113468 A1* | 4/2018 | Russell | G06V 20/10 |
| 2020/0070343 A1* | 3/2020 | Thomaz | B25J 9/163 |
| 2020/0070344 A1 | 3/2020 | Thomaz et al. | |
| 2020/0082248 A1 | 3/2020 | Villegas et al. | |
| 2021/0178576 A1* | 6/2021 | Murphy | B25J 19/023 |
| 2021/0276187 A1* | 9/2021 | Tang | G06N 3/08 |
| 2023/0390935 A1* | 12/2023 | Nakamura | B25J 13/00 |
| 2024/0157552 A1* | 5/2024 | Thomaz | B25J 9/163 |
| 2024/0192690 A1* | 6/2024 | Ebrahimi Afrouzi | |
| | | | B25J 13/087 |

OTHER PUBLICATIONS

Schwenkel et al., "Optimizing Sequences of Probabilistic Manipulation Skills Learned from Demonstration," 3rd Conference on Robot Learning, 2019, 10 pages.

* cited by examiner

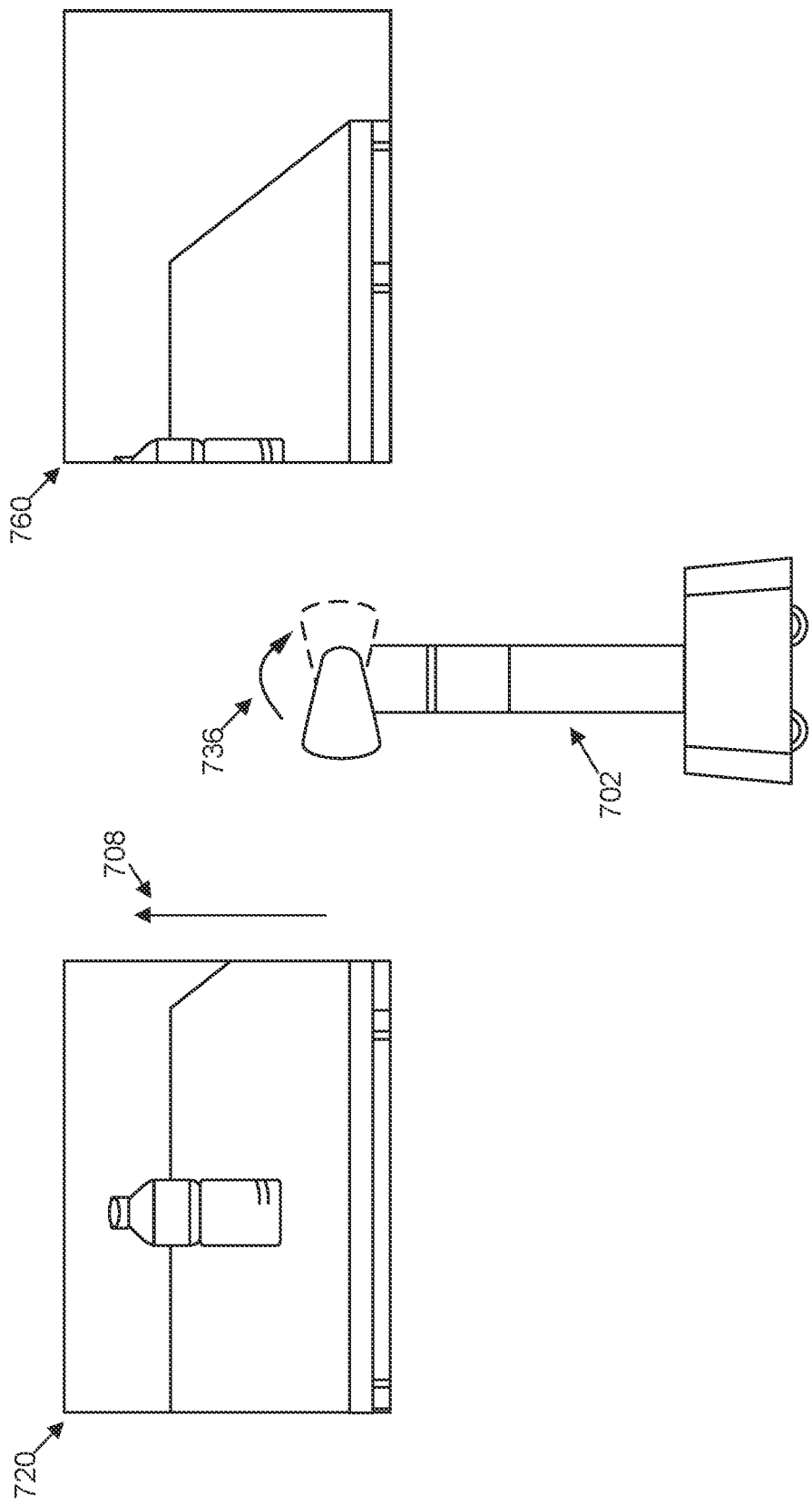

LEARNING FROM DEMONSTRATION FOR DETERMINING ROBOT PERCEPTION MOTION

CROSS-REFERENCE TO RELATED APPLICATIONS

This application claims priority to U.S. Provisional Patent Application No. 63/244,902, filed Sep. 16, 2021, the disclosure of which is incorporated by reference herein in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a perception trajectory determination method through learning from demonstration. A robotic device may include a moveable perception system. The robotic device may use a machine learning model trained on training data including robot planner states that represent at least one future trajectory of the robotic device and corresponding operator-directed perception system trajectories to determine a trajectory through which to move its perception system.

In an embodiment, a method includes determining, for a robotic device that comprises a perception system, a robot planner state representing at least one future path for the robotic device in an environment. The method additionally includes determining a perception system trajectory by inputting at least the robot planner state into a machine learning model trained based on training data comprising at least a plurality of robot planner states corresponding to a plurality of operator-directed perception system trajectories. The method further includes controlling, by the robotic device, the perception system to move through the determined perception system trajectory.

In another embodiment, a robotic device includes a perception system and a control system. The control system may be configured to determine a robot planner state representing at least one future path for the robotic device in an environment. The control system may also be configured to determine a perception system trajectory by inputting at least the robot planner state into a machine learning model trained based on training data comprising at least a plurality of robot planner states corresponding to a plurality of operator-directed perception system trajectories. The control system may further be configured to control the perception system to move through the determined perception system trajectory.

In a further embodiment, non-transitory computer readable medium is provided which includes program instructions executable by at least one processor to cause the at least one processor to perform functions. The functions include determining, for a robotic device that comprises a perception system, a robot planner state representing at least one future path for the robotic device in an environment. The functions also include determining a perception system trajectory by inputting at least the robot planner state into a machine learning model trained based on training data comprising at least a plurality of robot planner states corresponding to a plurality of operator-directed perception system trajectories. The functions further include controlling the perception system to move through the determined perception system trajectory.

In a further embodiment, a system is provided that includes means for determining, for a robotic device that comprises a perception system, a robot planner state representing at least one future path for the robotic device in an environment. The system also includes means for determining a perception system trajectory by inputting at least the robot planner state into a machine learning model trained based on training data comprising at least a plurality of robot planner states corresponding to a plurality of operator-directed perception system trajectories. The system further includes means for controlling the perception system to move through the determined perception system trajectory.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 7D depicts a robotic device controlling its perception system to move through a perception system trajectory, in accordance with example embodiments.

DETAILED DESCRIPTION

Figure 1:
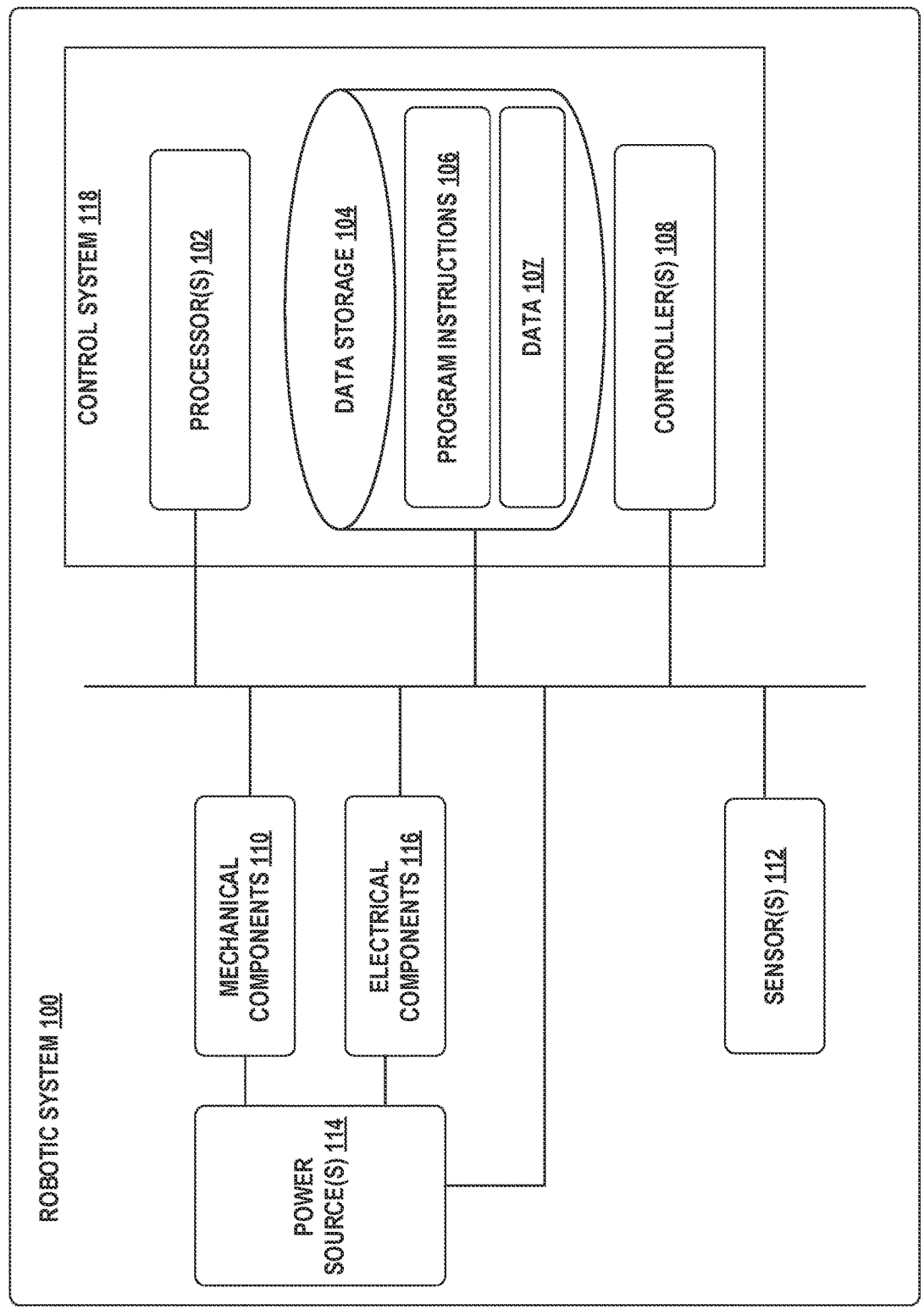
FIG. 1 illustrates a configuration of a robotic system, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

A robotic device may include a perception system to facilitate navigation and task fulfillment. The perception system may include cameras, LIDAR sensors, and/or other sensors that facilitate a better understanding of the environment. The perception system may be independently controlled by the robotic device to view the environment from different perspectives. For example, a robotic device may have a perception system that includes a LIDAR sensor with a 360 degree horizontal field of view and a pan-tilt camera that may have a more limited field of view than the LIDAR sensor but may provide additional information about the environment that the LIDAR sensor may be unable to provide. The pan-tilt camera may thus be controlled to pan and/or tilt in order to collect data outside the limited current field of view. For example, the pan-tilt camera may only be able to see objects in the direction that it is facing, and it may not be able to see objects in the opposite direction that it is facing or to the side of the direction that it is facing. To view objects in a direction the robotic device is not facing, the robotic device may control the pan-tilt camera to turn and observe objects in those directions. For example, the robotic device may intend on moving backwards, and the robotic device may control the pan-tilt camera to rotate 180 degrees to observe behind the robotic device. In some examples, the LIDAR sensor may also be controlled to collect data outside its current field of view. Another variation may be that the perception system may be controlled as a whole to collect data outside the LIDAR sensor's and/or the pan-tilt camera's field of view.

One challenge that may arise in these examples is determining how the robotic device should control the perception system and/or sensors in the perception system. For example, the robotic device may be navigating in a crowded environment with many obstacles. The robotic device may intend to navigate forward, but the robotic device may detect an object in front of it. Because the perception system may not be able to observe every area of the environment at the same time, the robotic device may need to control the perception system to observe obstacles in other potential paths, including to the right and the left of the robotic device. In some situations, an inefficient control method may cause the robotic device to awkwardly jerk its perception system from side to side to determine which direction to move. However, this may provide a less than optimal response time and user experience.

Further, the perception system may be involved in multiple processes and it may be difficult to determine which process to prioritize. For example, the perception system may be used to determine details about objects, determine the state of a changing environment, find specific objects in the environment, and so on. It may thus be difficult to determine which of these processes to do before another, and inefficient prioritization may result in a robotic device that takes more time to execute tasks, fails to execute time sensitive tasks (e.g., observing a walking person before they exit the environment), among other issues.

Provided herein are methods to determine how to control a perception system of a robotic device through a data-driven approach based on perception system trajectories controlled by one or more operators. In some examples, an operator (e.g., a remote human operator) may be tasked with manually controlling the perception system based on data received from the robotic device. The trajectory of the perception system as controlled by the remote operator and various sensor data from the robotic device may be stored and used to train a machine learning model that can output perception system trajectories. The machine learning model may then be used to determine perception system trajectories whenever the robotic device is operating. This approach may be a more streamlined approach to determining perception system trajectories and may facilitate more intuitive movements of the perception system, which may give rise to better user experiences.

An operator may be able to operate the perception system of a robotic device in a variety of ways. In some examples, the operator may be walking with the robotic device as the robotic device is navigating in the environment. The operator may guide the perception system using a control system that is communicating with the robotic device (e.g., a joystick controller). However, this approach may result in less than accurate training data, because the operator is not presented with the data that the robotic device collects and instead relies on the operator's perception and memory. Alternatively, the system may include a computing device with a screen (perhaps attached to the robotic device). The robotic device may present sensor data to the operator, and based on the presented sensor data, the operator may guide the perception system using a control system that is communicating with the robotic device. Such an approach may result in more accurate training data, since the operator is being presented with sensor data that the robotic device collects.

In further examples, the operator may be presented with sensor data and operate the robotic device remotely. For example, the remote operator may be located in a base station that receives sensor data from the robotic device, perhaps including LIDAR data, camera data, and so on. The sensor data may be processed into an operator-friendly format before being presented to the operator. Further, the remote operator may be presented with data indicating where the robotic device intends to navigate to next, and the remote operator may make a decision on how to control the perception system based on where the robotic device intends to navigate to next and the sensor data representing the environment. The remote operator's control instructions may be communicated back to the robotic device, and the perception system may be controlled based on those control instructions. This process may be continued in the same environment or in a variety of environments until sufficient training data is collected.

Additionally or alternatively, determining how to control the perception system may be an immersive experience for the remote operator. For example, the remote operator may use a virtual reality headset that displays a representation of the environment in which the robotic device is operating. The representation of the environment in which the robotic device is operating may be created using sensor data communicated from the robotic device. Because the operator is being presented with environmental data as collected by the robotic device, the perception system trajectories may be more accurate, and additional sensor data collected after the perception system has moved may better capture environmental information.

In some examples, the robotic device may determine a path where it intends on navigating to next, and the operator may only control the perception system of the robotic device. The robotic device may send to the remote operator the collected sensor data and the path indicating where the robotic device intends on navigating to next. The remote operator may make a determination on where to move the perception system based on the collected sensor data and the intended trajectory of the robotic device. Alternatively, the robotic device may send only the collected sensor data, and the remote operator may determine where to move the robotic device before sending an indication on where to move the robotic device. In practice, situations where the robotic device determines the intended path may facilitate more streamlined training data collection, because fewer variables may depend on the decisions of the operator.

The sensor data and the operator-directed perception system trajectories may be determined in a variety of environments and using a variety of operators, which may also facilitate better predictions. For example, the sensor data may be collected from crowded environments where the perception system may have to move more to gain an accurate perception of the environment and objects in the environment, from sparse environments where the perception system may not need as many trajectories to obtain an accurate perception of the environment, from environments with many moving objects where the perception system may need to gather more frequent updates, from environments with less moving objects where the perception system may not need to gather as many updates, and so on.

The sensor data collected by the robotic device, the intended future path or paths of the robotic device, and the operator-determined perception trajectory for the robotic device may be stored in a server, on the robotic device, and/or on the computing device of the operator to be used to determine future perception system trajectories.

In some examples, a machine learning model may be used to determine future perception system trajectories after being trained on the stored data. The machine learning model may take, as an input, a planner state, which may include at least one future path for the robotic device in the environment. For example, if the robotic device is at a location and is planning on navigating forward, the planner state may include an indication that the future path may be directly forward from the robotic device. The planner state may include coordinates, perhaps indicating a current position of the robotic device and a future position of the robotic device, directions, and/or other information indicative of the future path. The machine learning model may output perception system trajectories, where each trajectory indicates how to control the perception system to move for a discrete period of time.

The machine learning model may also take, as an additional input, a tracker state, which may include environmental information. For example, the tracker state may include LIDAR sensor data collected from the robotic device and viewed by the human operator. The tracker state may also include representations of movement of objects in the environment. For example, the robotic device may be operating in an environment with a car, and the car may be approaching the robotic device. The tracker state may thus include an indication that an object is approaching and the location of the object as detected through the perception system sensors.

To train the machine learning model, the planner state representing at least one future path for the robotic device, the tracker state representing environmental information, and the operator controlled trajectories may be combined into a training dataset. The planner state and the tracker state may be inputs into the machine learning model and the weights of the machine learning model may be tuned based on the predicted operator controlled trajectories in comparison with the actual operator controlled trajectories. In some examples, the planner state and the tracker state may be vectors including an indication of current location, future location, velocity of the robotic device or object, or a combination thereof.

In some examples, the planner and/or tracker states may be outputs of one or more machine learning models. For example, the planner state indicating future paths of the robotic device may be determined by a machine learning model, and that machine learning model may feed the output into another machine learning model that determines the perception system trajectories. In examples where the input to the machine learning model that determines the perception system trajectories also includes the tracker state, the tracker state may also be determined using a separate machine learning model, and that separate machine learning model may feed the output into the machine learning model that determines the perception system trajectories. Additionally, the planner and tracker states may be determined by a single machine learning model, where the output of the single machine learning model is input into the machine learning model that determines the perception system trajectories. In some examples, a machine learning model that determines the planner and tracker states may include autoregressive networks such as recurrent neural networks (RNNs), transformers, and/or long short-term memory (LSTM) networks.

In some examples, the machine learning model may be trained based on a large dataset including training data from various environments and various operators. After being trained on training data from various environments and various operators, the machine learning model may be fine-tuned based on the specific environment in which the robotic device is operating. For example, the machine learning model may be trained based on a dataset that includes perception system trajectories for a crowded environment, an empty environment, a fast-changing environment, a slow-changing environment, and so on. The robotic device may determine that it is located inside a warehouse and send a message to fine-tune the pre-trained machine learning model on specifically warehouse data and the associated perception system trajectories. In some examples, classifying the environment and fine-tuning the pre-trained machine learning model may be done after the robotic device receives an indication that it has been relocated to a new environment. In further examples, classifying the environment and fine-tuning the pre-trained machine learning model may be done periodically, perhaps when the robotic device is idle at night.

II. EXAMPLE ROBOTIC SYSTEMS

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
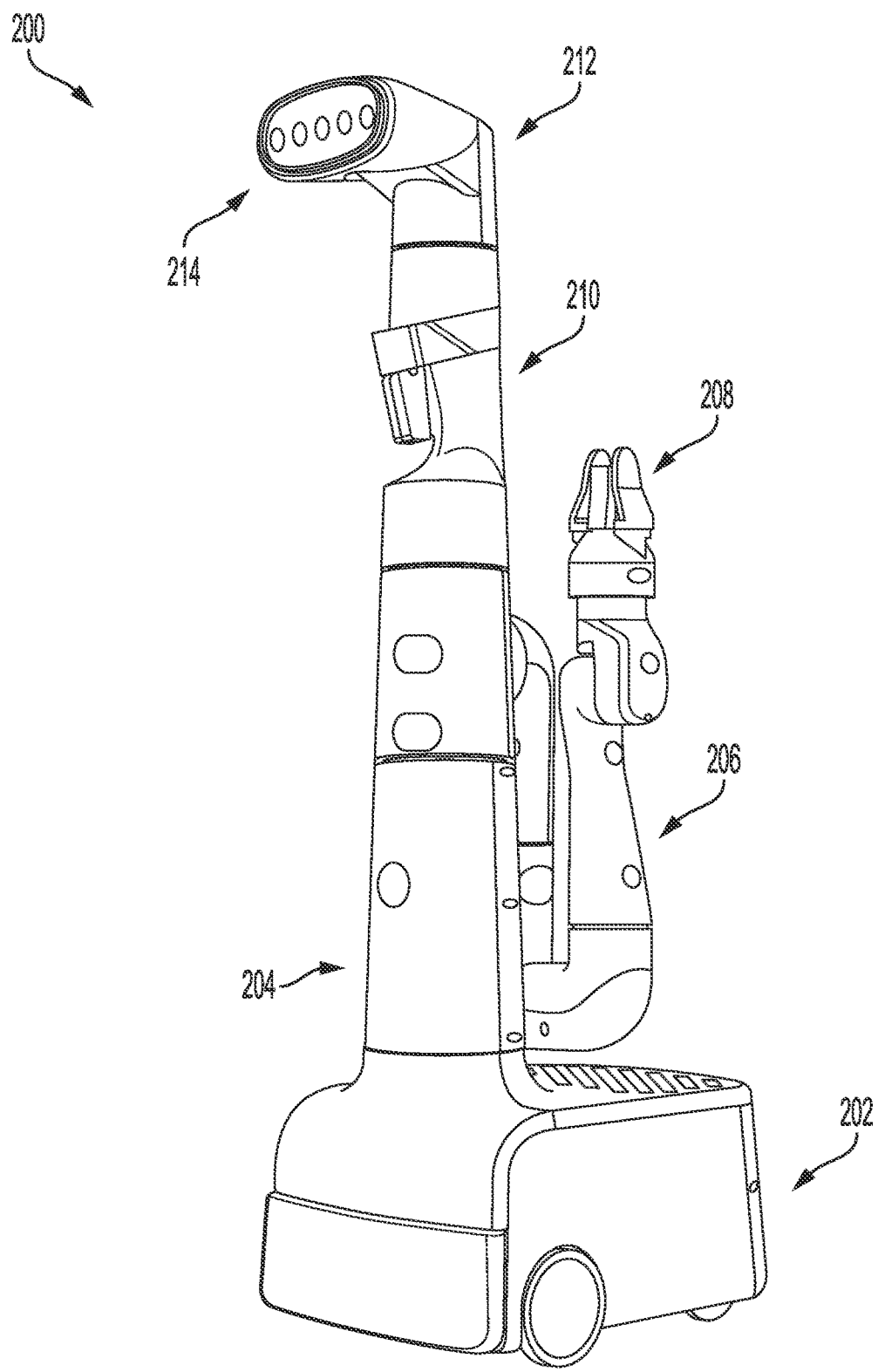
FIG. 2 illustrates a mobile robot, in accordance with example embodiments.
Figure 3:
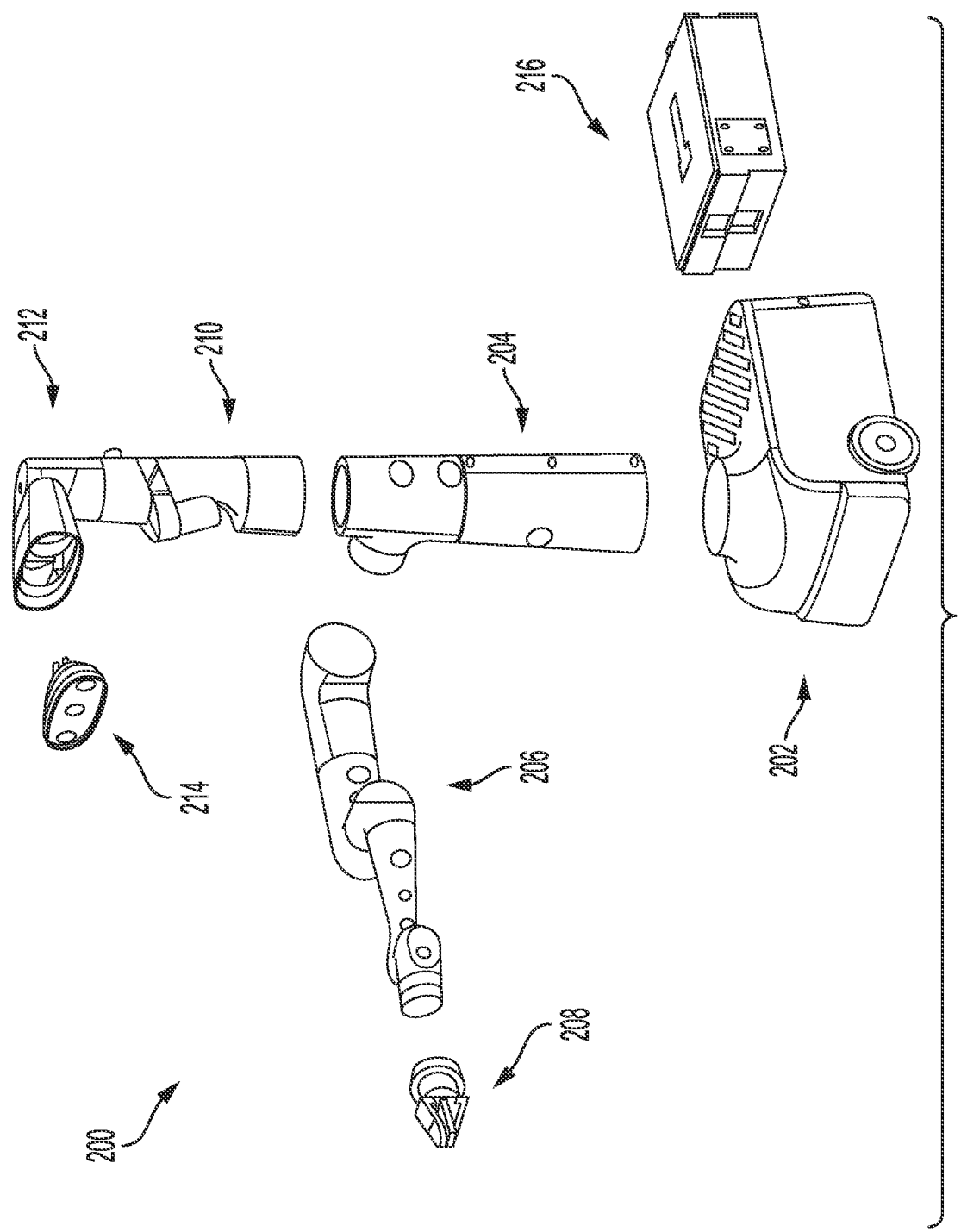
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
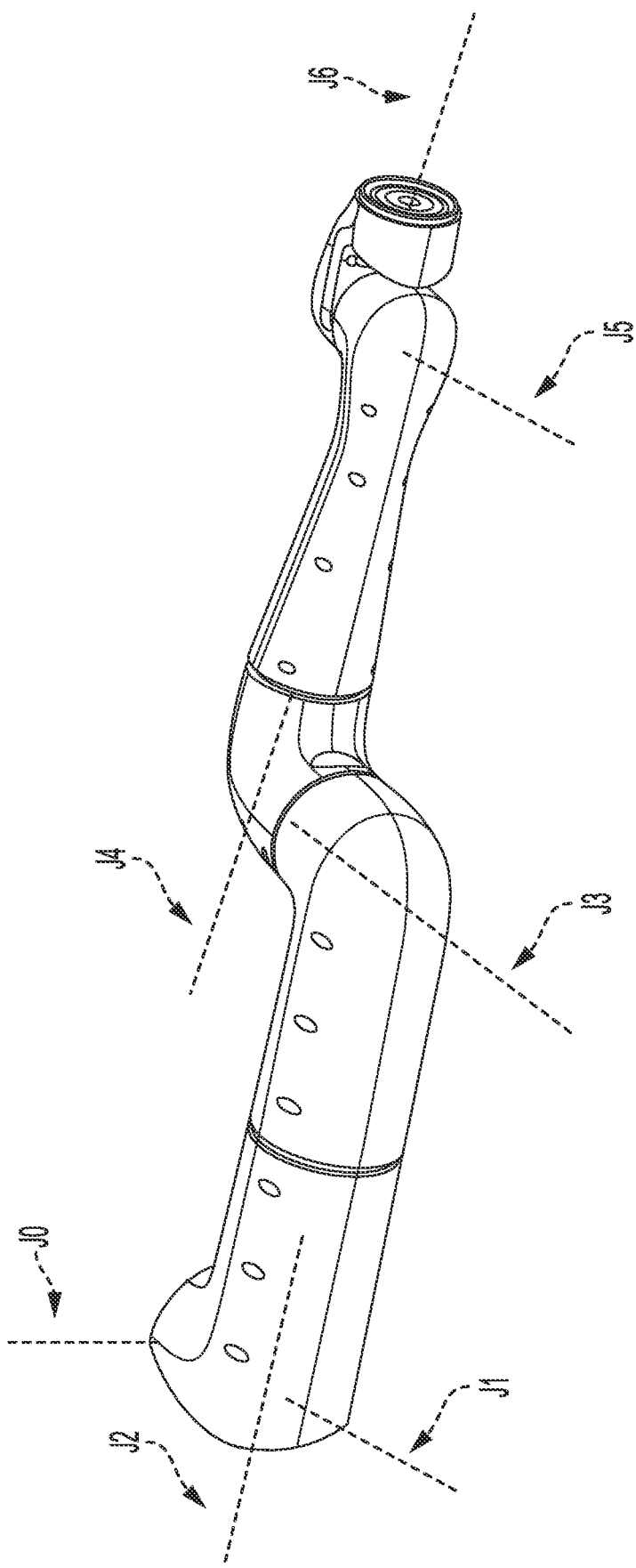
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
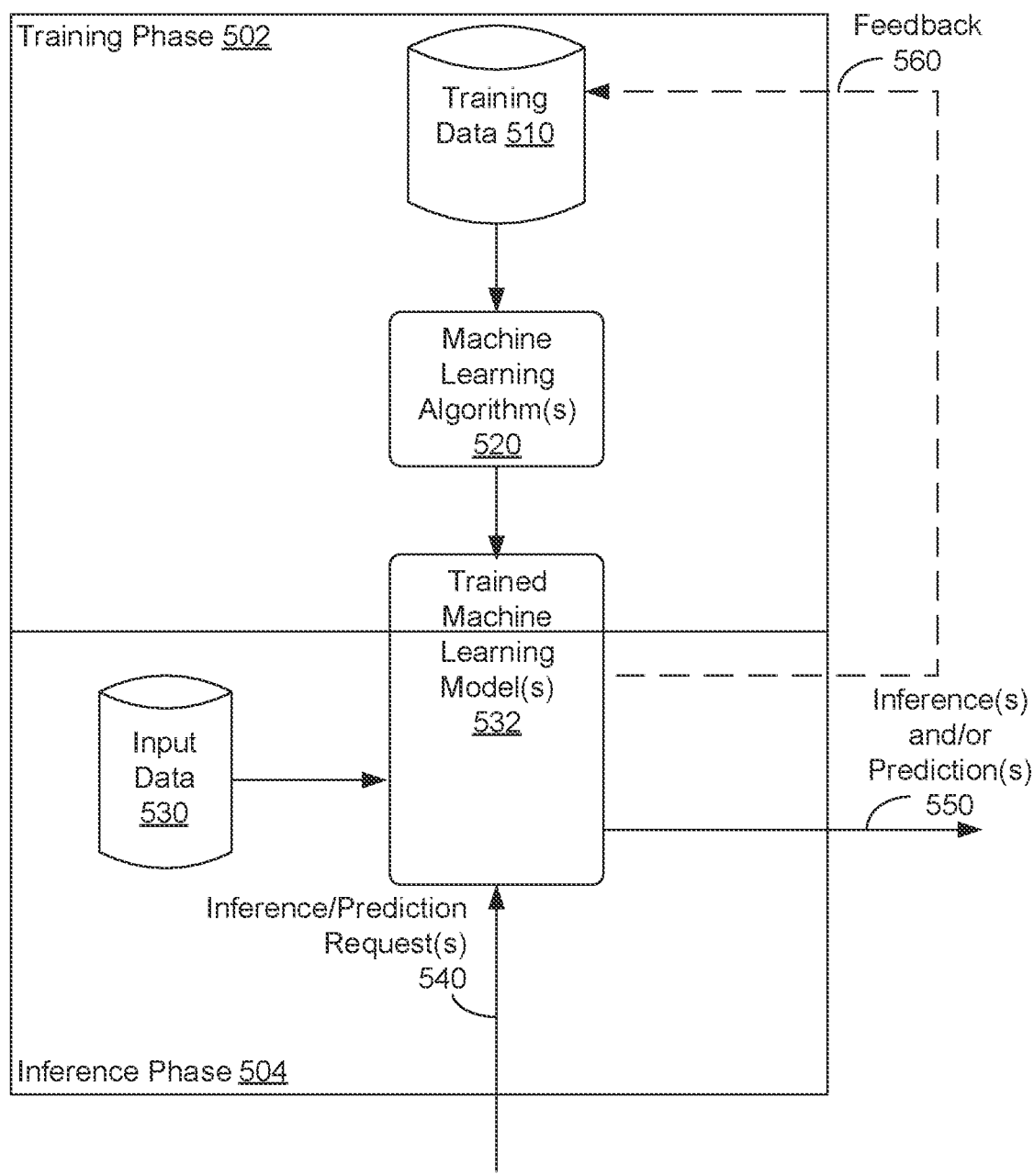
FIG. 5 is a diagram illustrating training and inference phases of a machine learning model, in accordance with example embodiments.

FIG. 5 shows diagram 500 illustrating a training phase 502 and an inference phase 504 of trained machine learning model(s) 532, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be referred to as a trained machine learning model. For example, FIG. 5 shows training phase 502 where one or more machine learning algorithms 520 are being trained on training data 510 to become trained machine learning model(s) 532. Then, during inference phase 504, trained machine learning model(s) 532 can receive input data 530 and one or more inference/prediction requests 540 (perhaps as part of input data 530) and responsively provide as an output one or more inferences and/or prediction(s) 550.

As such, trained machine learning model(s) 532 can include one or more models of one or more machine learning algorithms 520. Machine learning algorithm(s) 520 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 520 may be supervised or unsupervised, and may implement any suitable combination of online and offline learning.

In some examples, machine learning algorithm(s) 520 and/or trained machine learning model(s) 532 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 520 and/or trained machine learning model(s) 532. In some examples, trained machine learning model(s) 532 can be trained, reside and execute to provide inferences on a particular computing device, and/or otherwise can make inferences for the particular computing device.

During training phase 502, machine learning algorithm(s) 520 can be trained by providing at least training data 510 as training input using unsupervised, supervised, semi-supervised, and/or reinforcement learning techniques. Unsupervised learning involves providing a portion (or all) of training data 510 to machine learning algorithm(s) 520 and machine learning algorithm(s) 520 determining one or more output inferences based on the provided portion (or all) of training data 510. Supervised learning involves providing a portion of training data 510 to machine learning algorithm(s) 520, with machine learning algorithm(s) 520 determining one or more output inferences based on the provided portion of training data 510, and the machine learning model may be refined based on correct results associated with training data 510. In some examples, supervised learning of machine learning algorithm(s) 520 can be governed by a set of rules and/or a set of labels for the training input, and the set of rules and/or set of labels may be used to correct inferences of machine learning algorithm(s) 520.

Semi-supervised learning involves having correct results for part, but not all, of training data 510. During semi-supervised learning, supervised learning is used for a portion of training data 510 having correct results, and unsupervised learning is used for a portion of training data 510 not having correct results. Reinforcement learning involves machine learning algorithm(s) 520 receiving a reward signal regarding a prior inference, where the reward signal can be a numerical value. During reinforcement learning, machine learning algorithm(s) 520 can output an inference and receive a reward signal in response, where machine learning algorithm(s) 520 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 520 and/or trained machine learning model(s) 532 can be trained using other machine learning techniques, including but not limited to, incremental learning and curriculum learning.

In some examples, machine learning algorithm(s) 520 and/or trained machine learning model(s) 532 can use transfer learning techniques. For example, transfer learning techniques can involve trained machine learning model(s) 532 being pre-trained on one set of data and additionally trained using training data 510. More particularly, machine learning algorithm(s) 520 can be pre-trained on data from one or more computing devices and a resulting trained machine learning model provided to computing device CD1, where CD1 is intended to execute the trained machine learning model during inference phase 504. Then, during training phase 502, the pre-trained machine learning model can be additionally trained using training data 510, where training data 510 can be derived from kernel and non-kernel data of computing device CD1. This further training of the machine learning algorithm(s) 520 and/or the pre-trained machine learning model using training data 510 of CD1's data can be performed using either supervised or unsupervised learning. Once machine learning algorithm(s) 520 and/or the pre-trained machine learning model has been trained on at least training data 510, training phase 502 can be completed. The trained resulting machine learning model can be utilized as at least one of trained machine learning model(s) 532.

In particular, once training phase 502 has been completed, trained machine learning model(s) 532 can be provided to a computing device, if not already on the computing device. Inference phase 504 can begin after trained machine learning model(s) 532 are provided to computing device CD1.

During inference phase 504, trained machine learning model(s) 532 can receive input data 530 and generate and output one or more corresponding inferences and/or prediction(s) 550 about input data 530. As such, input data 530 can be used as an input to trained machine learning model(s) 532 for providing corresponding inference(s) and/or prediction(s) 550 to kernel components and non-kernel components. For example, trained machine learning model(s) 532 can generate inference(s) and/or prediction(s) 550 in response to one or more inference/prediction requests 540. In some examples, trained machine learning model(s) 532 can be executed by a portion of other software. For example, trained machine learning model(s) 532 can be executed by an inference or prediction daemon to be readily available to provide inferences and/or predictions upon request. Input data 530 can include data from computing device CD1 executing trained machine learning model(s) 532 and/or input data from one or more computing devices other than CD1.

Input data 530 can include training data described herein. Other types of input data are possible as well.

Inference(s) and/or prediction(s) 550 can include task outputs, numerical values, and/or other output data produced by trained machine learning model(s) 532 operating on input data 530 (and training data 510). In some examples, trained machine learning model(s) 532 can use output inference(s) and/or prediction(s) 550 as input feedback 560. Trained machine learning model(s) 532 can also rely on past inferences as inputs for generating new inferences.

After training, the trained version of the neural network can be an example of trained machine learning model(s) 532. In this approach, an example of the one or more inference/prediction request(s) 540 can be a request to predict a classification for an input training example and a corresponding example of inferences and/or prediction(s) 550 can be a predicted classification output.

Figure 6:
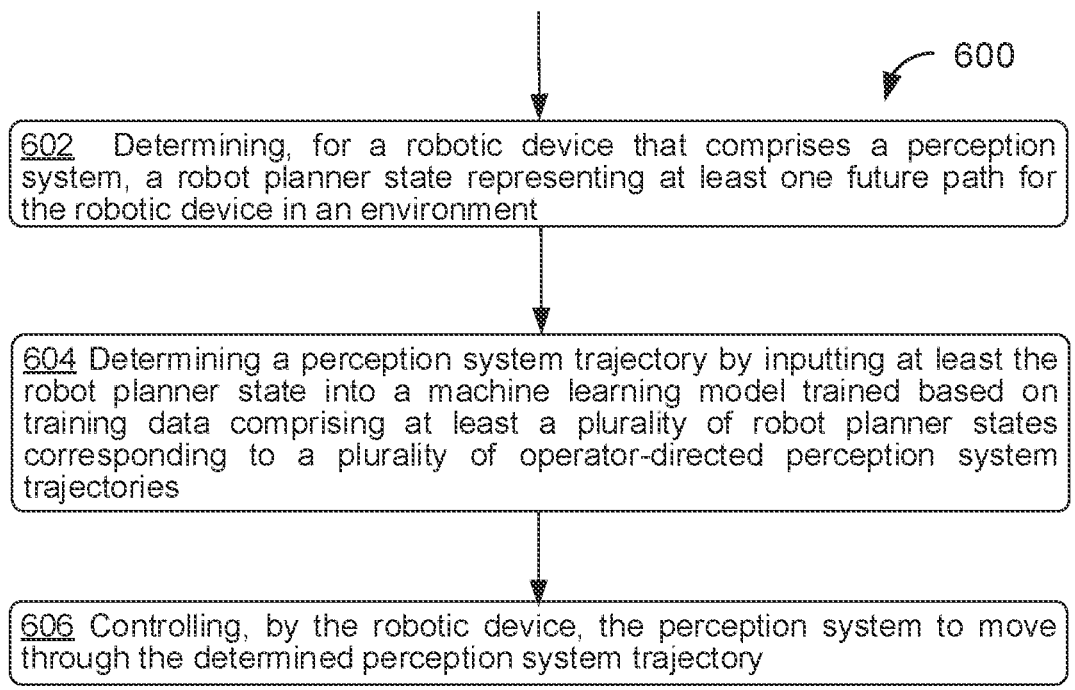
FIG. 6 is a block diagram of a method, in accordance with example embodiments.

FIG. 6 is a block diagram of method 600, in accordance with example embodiments. Blocks 602, 604, and 606 may collectively be referred to as method 600. In some examples, method 600 of FIG. 6 may be carried out by a control system, such as control system 118 of robotic system 100. In further examples, method 600 of FIG. 6 may be carried out by a computing device or a server device remote from the robotic device. In still further examples, method 600 may be carried out by one or more processors, such as processor(s) 102, executing program instructions, such as program instructions 106, stored in a data storage, such as data storage 104. Execution of method 600 may involve a robotic device, such as the robotic device illustrated and described with respect to FIGS. 1-4. Further, execution of method 600 may involve a computing device or a server device remote from the robotic device and robotic system 100. Other robotic devices may also be used in the performance of method 600. In further examples, some or all of the blocks of method 600 may be performed by a control system remote from the robotic device. In yet further examples, different blocks of method 600 may be performed by different control systems, located on and/or remote from a robotic device.

Those skilled in the art will understand that the block diagram of FIG. 6 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 602, method 600 includes determining, for a robotic device that comprises a perception system, a robot planner state representing at least one future path for the robotic device in an environment. For example, the robotic device may be robot 200 and the perception system may include perception housing 212 and perception suite 214. In some examples, the perception system may include sensors such as a LIDAR sensor and/or a system of one or more cameras, among other possible sensors. These sensors may collectively collect environment data, and the robotic device may build one or more maps of the environment based on the collected environment data. Robot planner states representing at least one future path for the robotic device in the environment may be based on these maps.

Figure 7A:
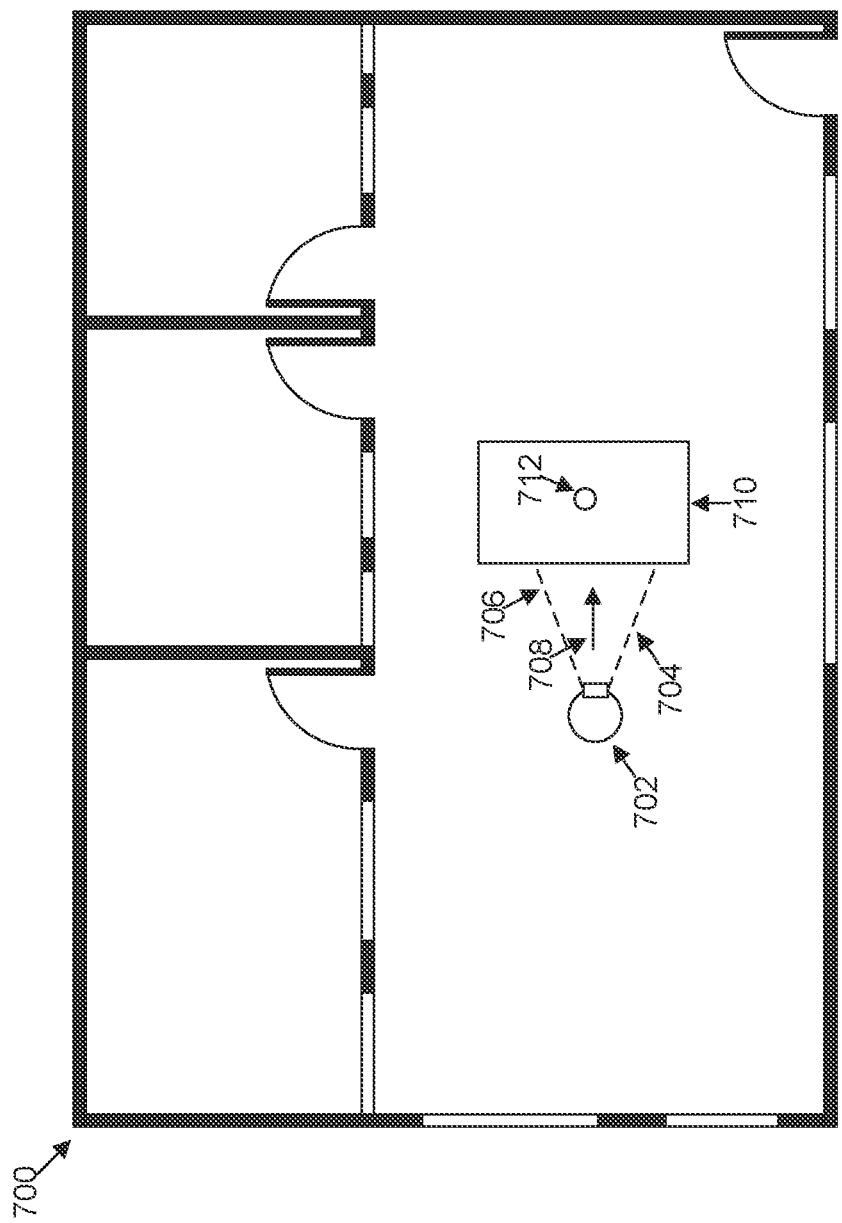
FIG. 7A depicts an environment, in accordance with example embodiments.

FIG. 7A depicts example environment 700 including robotic device 702, table 710, and object 712. In environment 700, robotic device 702 may be navigating towards table 710, as indicated by arrow 708. Arrow 708 may represent an indication of the future path for the robotic device in the environment. Robotic device 702 may have a field of view indicated by lines 704 and 706.

In some examples, the robot planner state including the future path of robotic device 702 may be task-driven. For example, in FIG. 7A, robotic device 702 may be tasked with picking up object 712 from table 710. Thus, robotic device 702 may determine the shortest path to object 712, and the robot planner state may therefore indicate that a future path of the robotic device is indicated by arrow 708. In practice, the robot planner state may be indicated by two or three dimensional coordinates, or two or three dimensional vectors (coordinates including a direction), among other possibilities. The coordinates may correspond to locations on an x-axis and a y-axis, or locations on an x-axis, a y-axis, and a z-axis.

In some examples, the robot planner state including the future path of the robotic device may be determined based on data collected from the environment. For example, the robotic device may analyze data obtained from the LIDAR sensor and from the system of one or more cameras using heuristics to obtain driveable areas. The future path of the robotic device may then be determined by selecting a driveable area. The selection of a driveable area may be task-driven. In other words, if a plurality of driveable areas are presented, the robotic device may determine a path in a direction that would help further the task. For example, robotic device 702 may have been tasked with picking up object 712 from table 710, and robotic device 702 may have determined that areas to the right, center, and left of itself are driveable. However, the robotic device may determine that the center direction, indicated by arrow 708, is the most efficient path to object 712, so the robotic device may determine that the robot planner state is indicated by arrow 708.

In some examples, the robot planner state including the future path of the robotic device may be determined based on staleness measurements. Staleness measurement may be based on previously collected sensor data and indicate an object location and a time at which the object at the object location was last detected. The robotic device may determine the robot planner state indicating the future path of the robotic device to be towards an area that is not stale (e.g., sensor data has been collected from the area within a threshold amount of time) and/or to avoid an area that is stale (e.g., sensor data has not been collected from the area within a threshold amount of time). For example, robotic device 702 may be deciding between two possible paths: straight or left. The area to the left of the robotic device may be stale, so the robotic device may determine that the robot planner state indicating at least one future path is in the direction of arrow 708 to avoid the path with stale data.

In further examples, the robot planner state including the future path of the robotic device may be determined based on a machine learning model. The machine learning model may take sensor data from the environment, task related information (e.g., location of target), location of the robotic device in the environment, or any combination thereof and output a robot planner state. A robot planner state computed using a machine learning model may be represented by coordinates and vectors, and/or be represented by a multi-dimensional layer output. For example, a multi-dimensional layer may represent several coordinates and/or vectors along with the probabilities that each path represented by the coordinates/vectors is feasible.

Referring back to FIG. 6, at block 604, method 600 includes determining a perception system trajectory by inputting at least the robot planner state into a machine learning model. In some examples, the perception system trajectory may be determined for a certain time frame in the future (e.g., one second in the future). Because changes in the environment may occur slowly, the robot planner states representing future paths of the robotic device may be one of the main factors in determining the perception system trajectory.

A perception system trajectory may be a trajectory through which robotic device 702 may control the perception system to move. Controlling the perception system to move through the perception system trajectory may be useful to collect additional information about the environment. For example, a map of the environment that the robotic device builds from the collected environmental data may have multiple blank areas for locations where the robotic device has not collected any data. Additionally or alternatively, the map of the environment that the robotic device builds may have multiple outdated areas for locations where the robotic device has not collected data recently. Because robot navigation and other aspects of robot performance may be based on these maps, blank spots and outdated areas may result in the robotic device operating based on inaccurate and/or incomplete data, which may affect robot performance. Movement of the robotic device's perception system thus may become more important to fill these gaps of information.

Figure 7B:
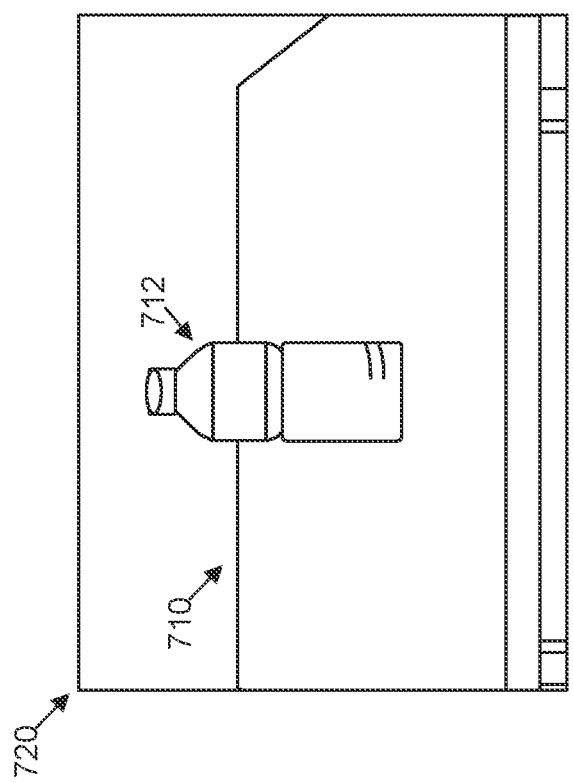
FIG. 7B depicts sensor data collected in an environment, in accordance with example embodiments.

FIG. 7B is a depiction of sensor data 720 of the environment as observed by the robotic device in environment 700, including table 710 and an object 712 on table 710. As shown, sensor data 720 may provide limited information about the environment. For example, going back to the example above, the robotic device may be tasked with picking up object 712 from table 710. However, because sensor data 720 shows an area that is not drivable, the robotic device may control the perception system to look for a driveable area.

Figure 7C:
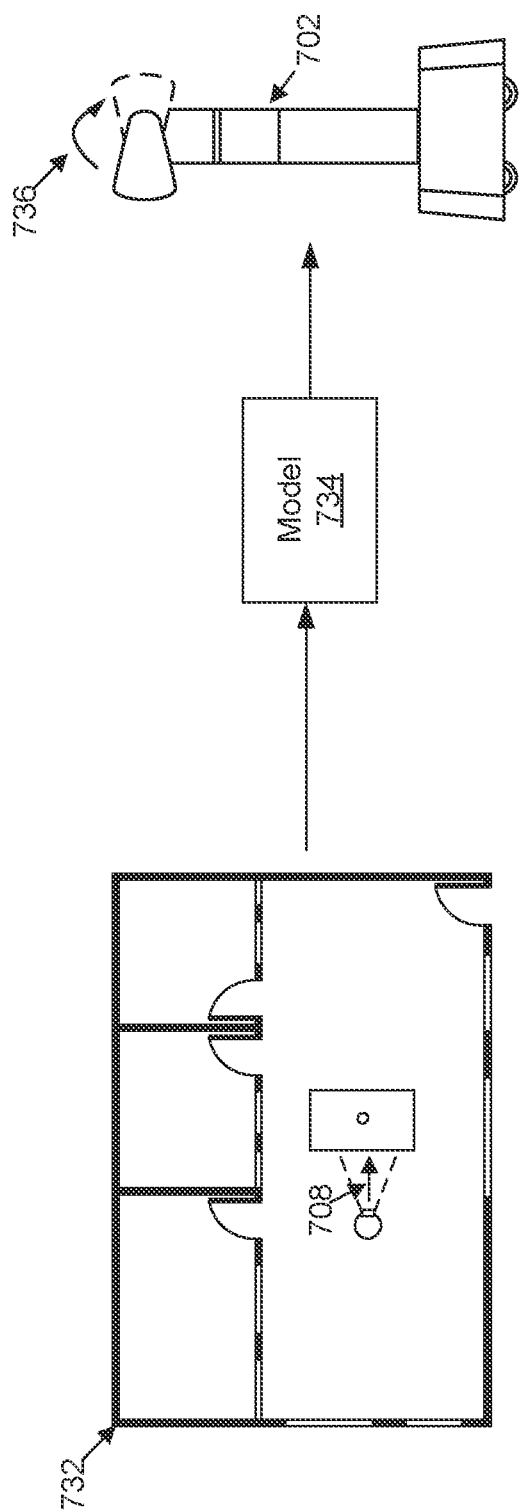
FIG. 7C depicts a machine learning model used to determine a perception system trajectory, in accordance with example embodiments.

The direction through which to move the perception system may be determined through using a machine learning model. FIG. 7C depicts example machine learning model 734, which may be used to determine perception system trajectory 736. Machine learning model 734 may take at least robot planner state 732 as an input. Robot planner state 732 may include at least a direction of intended travel of the robot, as indicated by arrow 708. As discussed later, machine learning model 734 may also take inputs in addition to robot planner state 732. These inputs may include tracker states, current perception system states, voxel maps, and/or staleness measurements. These inputs may be input into machine learning model 734 as a vector or multi-dimensional matrix, which may then be used by machine learning model 734 to determine and output perception system trajectory 736.

Referring back to FIG. 6, at block 606, the method includes controlling, by the robotic device, the perception system to move through the determined perception system trajectory. In some examples, after moving through the determined perception system trajectory, the robotic device may collect additional sensor data. Additionally or alternatively, after controlling the perception system to move through the perception system trajectory, the robotic device may be controlled to move along the path indicated by the robot planner state. Further, after controlling the perception system to move through the perception system trajectory, the robotic device may receive additional sensor data and update any environment representation based on the received sensor data.

For example, FIG. 7D depicts robotic device 702 controlling its perception system to move through determined perception system trajectory 736. As mentioned above, robotic device 702 may have determined perception system trajectory 736 through inputting sensor data 720 and/or the robot planner state indicated by arrow 708 into a machine learning model (perhaps with other data). Robotic device 702 may collect additional data after having moved its perception system through determined perception system trajectory 736, e.g., sensor data 760.

Figure 8A:
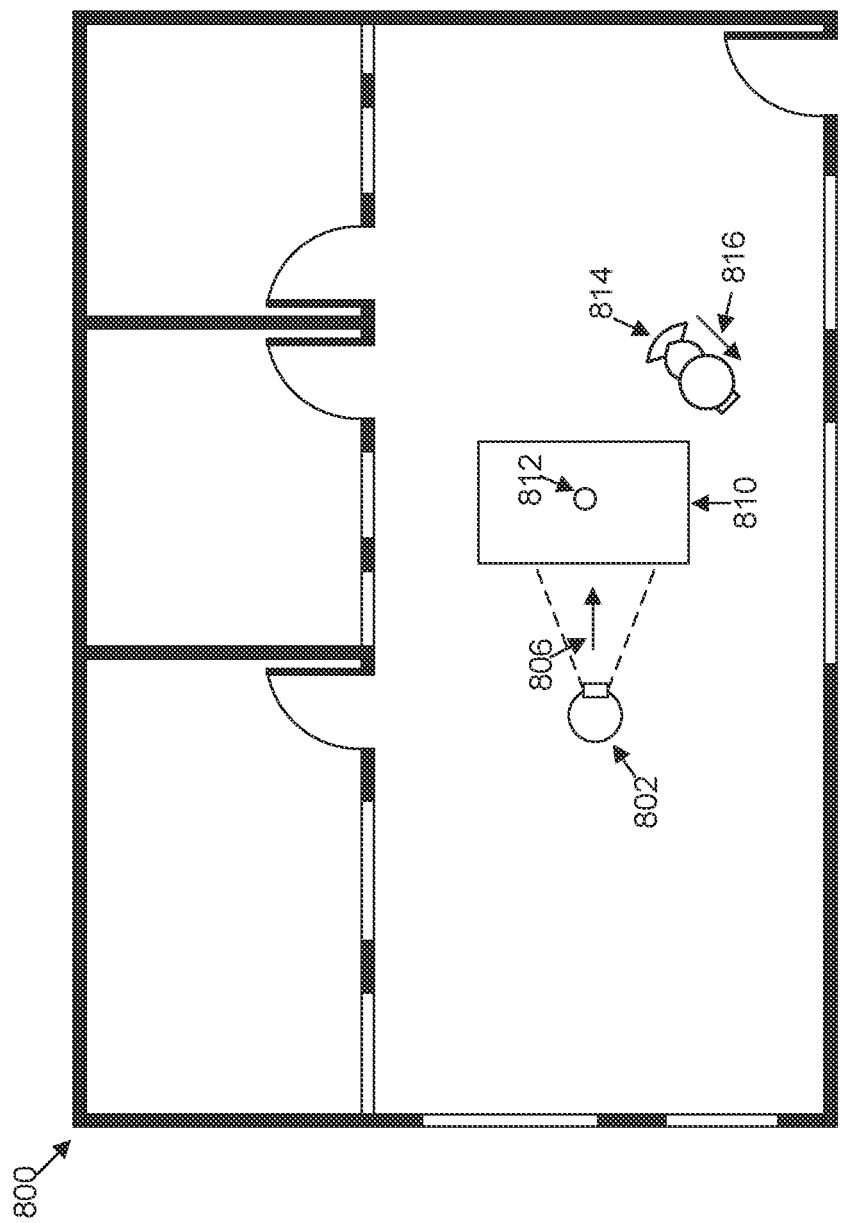
FIG. 8A depicts an environment, in accordance with example embodiments.
Figure 8B:
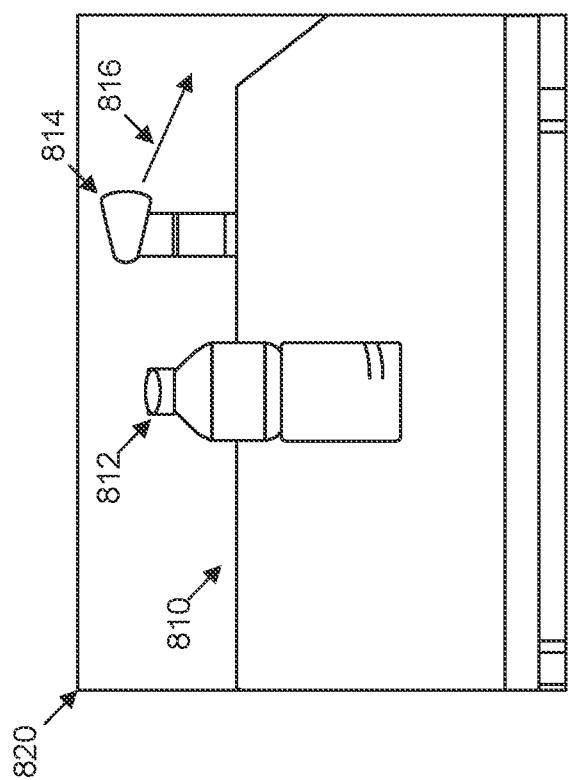
FIG. 8B depicts sensor data collected in an environment, in accordance with example embodiments.

As mentioned above, the perception system trajectory may be determined through applying a machine learning model. The machine learning model may be trained using training data including at least robot planner states and operator determined perception system trajectories. As an example, FIG. 8A depicts example environment 800, which includes robotic device 802. Environment 800 also includes moving robotic device 814, which is navigating in the direction of arrow 816. Robotic device 802 may use sensors in its perception system to collect sensor data. FIG. 8B is a depiction of sensor data 820 of the environment as observed by the robotic device in environment 800, including table 810 and object 812 on table 810. Sensor data 820 may also include moving robotic device 814 navigating in the direction of arrow 816.

Figure 8C:
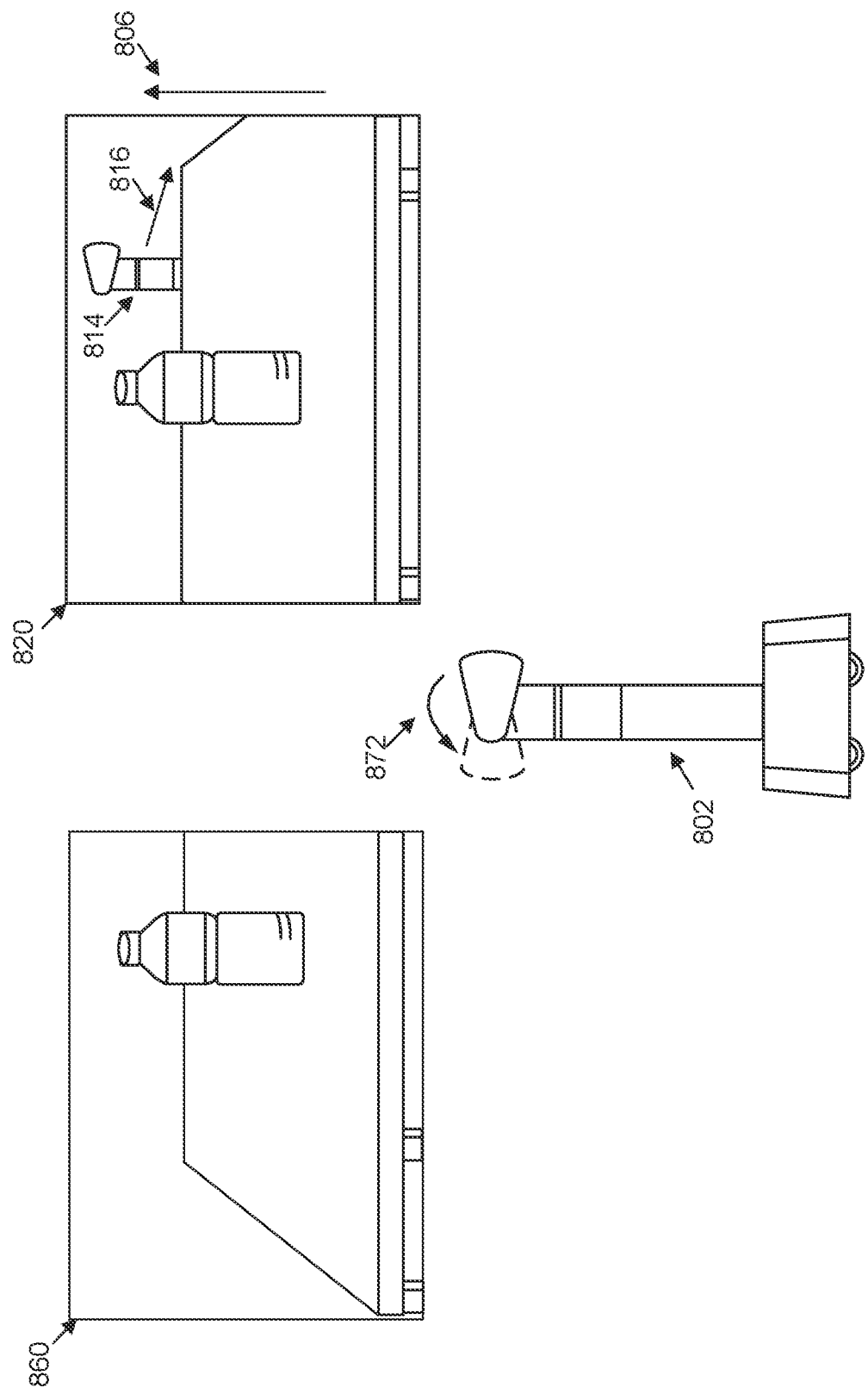
FIG. 8C depicts an operator-determined perception system trajectory, in accordance with example embodiments.

Using this sensor data, an operator may determine a direction in which to move the perception system of robotic device 802. FIG. 8C depicts robotic device 802 and determined perception system trajectory 872. Robotic device 802 may have collected sensor data 820, and the robot planner state (e.g., the direction in which robotic device 802 is intending to navigate) may be indicated by arrow 806. Sensor data 820 and the future path of the robotic device indicated by arrow 806 may be sent to an operator, who may determine the trajectory through which to move the perception system. The process of determining the perception system trajectory may occur in various ways.

As mentioned above, and in some examples, the operator may direct the perception system through an operator device that can directly control movement of the robotic device (e.g., a joystick controller). The operator device may be proximate to robotic device 802 or integrated into the robotic device. The operator may be present next to robotic device 802 to observe an environment view similar to the environment as observed by robotic device 802. For example, the operator may observe a similar view of the environment as shown in sensor data 820. The operator may assume that a future path of robotic device 802 is the direction that robotic device 802 is facing and/or the direction that the perception system of robotic device 802 is facing, e.g., as indicated by arrow 806. The operator may use these assumptions about the future path of the robotic device to determine the direction through which to move the perception system of robotic device 802. Additionally or alternatively, the operator device may include a screen through which sensor data 820 obtained by robotic device 802 and a future path of robotic device 802 may be presented to the operator.

In further examples, the operator may be controlling robotic device 802 remotely. Robotic device 802 may send sensor data 820 and the robot planner state representing at least one future path of the robotic device as represented by arrow 806 to a remote operator device, where a remote operator may view sensor data 820 and the future path of the robotic device as indicated by arrow 806. As mentioned above, viewing sensor data 820 and the future path of the robotic device may be enabled using an immersive device for the operator. For example, the remote operator device may be a virtual reality headset that displays a representation of the environment in which the robotic device is operating. Based on the sensor data and the future path of the robotic device, the remote operator may decide that moving the perception system along perception system trajectory 872 may be the next logical step. The remote operator device may send an instruction indicating to robotic device 802 to move the perception system along perception system trajectory 872. Robotic device 802 may carry out the instruction, after which robotic device 802 may collect sensor data 860.

Regardless of the method being used to direct the movement of the perception system of the robotic device, the operator-directed perception system trajectories may be collected through sending at least a future robot path to an operator device. Sensor data, maps of the environment, and other environmental data may also be sent to the operator device. The operator device may receive and display the received future robot path and the received environmental data. An operator monitoring the operator device may determine a trajectory through which to move the perception system, and the determined perception system trajectory may be transmitted to the robotic device. The robotic device may receive the instruction and move the perception system through the perception system trajectory.

In some cases, this process may be repeated to collect additional data relating to perception system trajectories in different situations. For example, after moving the perception system as directed, the robotic device may collect additional sensor data and determine a further future path of the robotic device (which may be the same as the previous future path of the robotic device). The further future path of the robotic device and the additional sensor data may be transmitted to the operator device for the operator to determine a further perception system trajectory.

In some examples, after the operator monitoring the operator device determines the trajectory through which to move the perception system, the operator device may send at least the future robot path and the determined perception system trajectory to a server device to be stored as training data. The operator device may also send the received sensor data and any other environmental data used to determine the determined perception system trajectory to be stored as training data. The server device may store this information with other perception system trajectories determined by various operators using various remote devices collected from robotic devices operating in various environments.

Other data related to the operation of the robotic device and the environment may also be sent to the operator device and stored as training data to be associated with the determined perception system trajectory. For example, the environment may include a variety of objects including those that are moving/moveable, as shown in FIGS. 8A-8C. Specifically, sensor data 820 depicts robotic device 814 navigating in the direction of arrow 816. Thus, to determine the perception system trajectory of robotic device 802, it may be useful to track objects in the environment, including robotic device 814.

Tracking items in the environment may be done by way of a tracker state, which may be determined by monitoring objects in the environment using the perception system and sensors on the perception system (e.g., LIDAR sensors, cameras, etc). The tracker state may indicate object locations and/or bounding boxes of the object, as well as trajectories of each object. As mentioned above, locations and bounding boxes may be represented by coordinates, and trajectories may be represented by coordinates, vectors, among others. In FIGS. 8A-8C, the tracker state may include the location of robotic device 814 and arrow 816 representing the direction in which robotic device 814 is navigating.

In some examples, training data may include coordinate locations of objects in the environment and bounding boxes for each respective object, tracker states indicating the direction in which an object is moving in the environment, perception system states indicating driveable areas, occupied areas, etc., staleness measurements corresponding to past environmental data. In some examples, these factors may be included in the training data as inputs that the machine learning model takes to determine the perception system trajectory. These factors may be discussed in further detail below.

In some examples, each element in the training data (e.g., input and associated output) may be associated with one or more tags, such as characteristics of the environment (e.g., cluttered, office environment, warehouse, etc.), time of day in which the data was collected, task information related to the operations of the robotic device when the data was being collected, and so on. These tags may be used to organize the data and to facilitate more accurate predictions. In some examples, the data may be stored in a remote device and/or the robotic device in place of or in addition to being stored in the server device. This data may be used as training data for a machine learning model that may be used to determine a perception system trajectory of the robotic device.

Figure 8D:
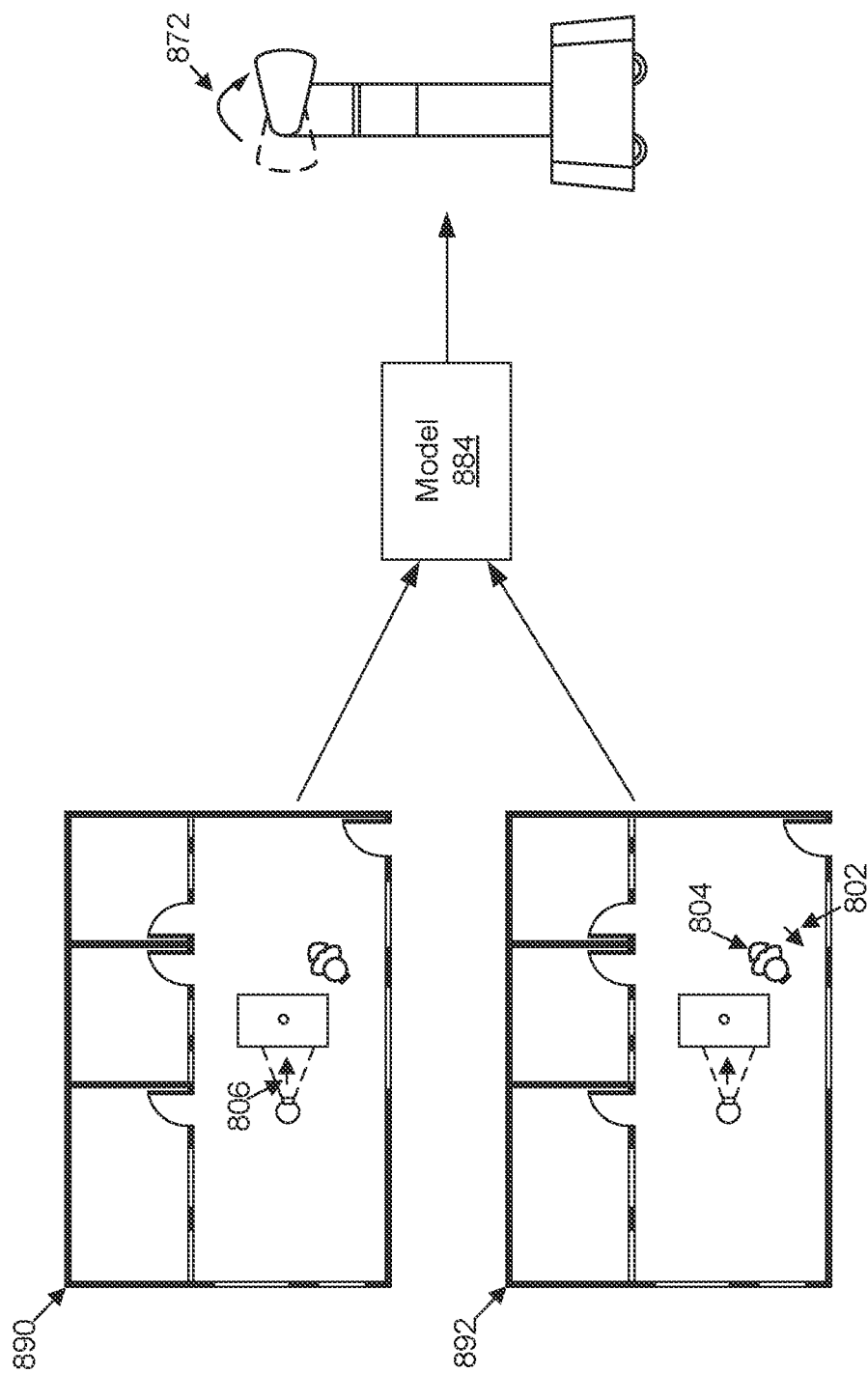
FIG. 8D depicts a machine learning model used to determine a perception system trajectory, in accordance with example embodiments.

FIG. 8D depicts machine learning model 884 which may be trained on inputs comprising robot planner states including robot planner state 890 and tracker states including tracker state 892, and outputs comprising perception system trajectories including perception system trajectory 872. Robot planner state 890 may include at least a direction of intended travel of the robotic device, as indicated by arrow 806. Tracker state 892 may include at least a direction of intended travel of objects in the environment, such as the direction of travel of robot 804, as indicated by arrow 802.

In general, a machine learning model used to determine perception system trajectories may at least take robot planner states as inputs. However, machine learning models may also take other inputs in addition to the robot planner states including tracker states, current perception system states, voxel maps, and staleness measurements. Any combination of these possible machine learning model inputs may serve as inputs to the machine learning model to determine the perception system trajectory.

In some examples, the machine learning model may take a current perception system state as an additional input. The current perception system state may represent an object location in the environment (e.g., robotic device 802 of FIGS. 8A-8D). In additional examples, the machine learning model may take voxel maps of the environment as an input. Voxel maps of the environment may be a three-dimensional representation of the environment, including occupied cells and non-occupied cells, where each cell represents a three-dimensional space in the environment.

In further examples, the machine learning model may take staleness measurements corresponding to past environmental data as an additional input. For example, the staleness measurement may indicate an object location and the time at which the object at the object location was last detected. If the object location is near the robotic device and is expected to be visible to the robotic device, an operator may decide and/or the machine learning model may determine, based on the staleness data, that the perception system should be controlled to view the object location.

In some examples, the machine learning model may first be trained on an entire set of training data, including robot planner states and the respective perception system trajectories associated with a variety of environments, operators, times of day, tasks, and so on. After having been trained on the entire set of training data, the machine learning model may then be trained on a subset of the training data specific to the application of the machine learning model.

For example, the robotic device may classify the environment in which it is located. This may be based on sensor data obtained from sensors in the perception system and/or based on data from maps of the environment that the robotic device created. Alternatively or additionally, the robotic device may access characteristics of the environment that were stored on the robotic device or on a server device. Through using these sources of information, robotic device 802 may determine that it is navigating in an office environment, and direct the trained machine learning model to be fine-tuned (e.g., further trained) based on a subset of the training data that has the tag "office environment." As another example, robotic device 802 may determine instead that the environment is relatively empty and direct the trained machine learning model to be fine-tuned based on a subset of the training data that do not have the tag "crowded." Other examples are possible.

In some examples, the machine learning model may be trained or fine-tuned periodically. For example, the machine learning model may be trained after a significant portion of training data has built up in the server device. The robotic device may be trained using training data including a certain number of available robot planner states and associated perception system trajectories, and the robotic device may track the number of further robot planner states and associated perception system trajectories stored on the server device. If the number of further robot planner states and associated perception system trajectories stored on the server device exceeds a threshold number, the robotic device may retrain the machine learning model based on training data including the further robot planner states and associated perception system trajectories. The machine learning model may be trained or fine-tuned whenever the robotic device is moved to another environment, periodically every few days, upon an interrupt by an operator, or any combination thereof The training and fine-tuning of the machine learning model may occur on any device, including, but not limited to, the robotic device, the server device, one of the operator devices, or another device. The trained machine learning model may be transmitted to the robotic device, and the other robotic device may input the necessary inputs (e.g., robot planner states, tracker states, current perception system states, voxel maps, staleness measurements, and/or a combination thereof as specified by the machine learning model) to determine the perception system trajectory.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, for a robotic device that comprises a perception system, a robot planner state representing at least one future path for the robotic device in an environment, wherein the perception system is independently controllable to move relative to the robotic device to view the environment from different perspectives;
   determining a perception system trajectory by inputting at least the robot planner state into a machine learning model trained based on training data comprising at least a plurality of robot planner states and a corresponding plurality of operator-directed perception system trajectories, wherein each of the operator-directed perception system trajectories is based on operator-generated instructions for control of a respective perception system relative to a respective robotic device for the corresponding robot planner state, and wherein the perception system trajectory comprises a trajectory through which to move the perception system relative to the robotic device; and
   controlling, by the robotic device, the perception system to move through the determined perception system trajectory relative to the robotic device.

2. The method of claim 1, wherein the method further comprises:
   determining, by the robotic device, a tracker state representing current environmental information, wherein the tracker state is also inputted into the machine learning model, wherein the training data includes a plurality of tracker states corresponding to the plurality of operator-directed perception system trajectories and the machine learning model has been trained using training data including the plurality of tracker states.

3. The method of claim 2, wherein the tracker state includes a plurality of object locations and a plurality of object trajectories, wherein each object location of the plurality of object locations corresponds to an object trajectory of the plurality of object trajectories.

4. The method of claim 3, wherein the object locations are each represented by a plurality of coordinates indicating an object bounding box.

5. The method of claim 1, wherein the method further comprises:

determining a current perception system state, wherein the current perception state comprises a plurality of indications of object locations in the environment, wherein the current perception state is also inputted into the machine learning model, wherein the training data includes a plurality of perception states and the machine learning model has been trained using the training data including the plurality of perception states.

6. The method of claim 1, wherein the method further comprises:
determining, from environment data received from the perception system, a voxel map of the environment, wherein the voxel map is also inputted into the machine learning model, wherein the training data includes a plurality of voxel maps of a plurality of different environments and the machine learning model has been trained using the training data including the plurality of voxel maps of the plurality of different environments.

7. The method of claim 1, further comprising:
determining staleness measurements corresponding to past environmental data, wherein the staleness measurements and the corresponding past environmental data are also inputted into the machine learning model, wherein the training data includes a plurality of staleness measurements and a plurality of past environmental data and the machine learning model has been trained using the training data including the plurality of staleness measurements and the plurality of past environmental data.

8. The method of claim 7, wherein determining the staleness measurements is performed before determining the robot planner state, and wherein determining the robot planner state is based on the determined staleness measurements.

9. The method of claim 1, wherein the robot planner state is a plurality of coordinates representing at least one future path for the robotic device in the environment.

10. The method of claim 1, wherein the machine learning model is a first machine learning model, and wherein the robot planner state is an output of a second machine learning model.

11. The method of claim 1, wherein the robot planner state is a second robot planner state, wherein the method further comprises:
determining a first robot planner state and environmental data corresponding to the first robot planner state;
transmitting, to a remote device, robot data including the first robot planner state and environmental data, wherein the robot data is presented to an operator at the remote device;
receiving, from the remote device, a first operator-directed perception system trajectory; and
storing the first operator-directed perception system trajectory to be included in the training data.

12. The method of claim 1, wherein the plurality of robot planner states includes robot planner states gathered from a plurality of robotic devices, collected in a plurality of environments, and presented to a plurality of operators to determine the plurality of operator-directed perception system trajectories.

13. The method of claim 1, wherein the method further comprises:
receiving, from the perception system, sensor data representative of the environment, wherein the sensor data is also inputted into the machine learning model, wherein the training data further comprises training sensor data related to the plurality of robot planner states and the plurality of operator-directed perception system trajectories;
determining, based at least on the sensor data, an environment representation;
after controlling the perception system to move through the determined perception system trajectory, receiving, from the perception system, additional sensor data; and
updating, based on the additional sensor data, the environment representation.

14. The method of claim 1, wherein the method further comprises:
identifying an environment classification, wherein the machine learning model is further trained based on fine-tuning training data comprising robot planner states and operator-directed trajectories collected in one or more other environments classified under the identified environment classification.

15. The method of claim 1, wherein the at least one future path for the robotic device is represented by a pair of coordinate numbers corresponding to locations on an x-axis and a y-axis or a triplet of coordinate numbers corresponding to locations on a x-axis, y-axis, and z-axis.

16. The method of claim 1, wherein the method further comprises:
after controlling the perception system to move through the determined perception system trajectory, controlling the robotic device to move along at least one future path in the environment.

17. A robotic device comprising:
a perception system, wherein the perception system is independently controllable to move relative to the robotic device to view an environment from different perspectives; and
a control system configured to:
determine a robot planner state representing at least one future path for the robotic device in the environment;
determine a perception system trajectory by inputting at least the robot planner state into a machine learning model trained based on training data comprising at least a plurality of robot planner states and a corresponding plurality of operator-directed perception system trajectories, wherein each of the operator-directed perception system trajectories is based on operator-generated instructions for control of a respective perception system relative to a respective robotic device for the corresponding robot planner state, and wherein the perception system trajectory comprises a trajectory through which to move the perception system relative to the robotic device; and
control the perception system to move through the determined perception system trajectory relative to the robotic device.

18. The robotic device of claim 17, wherein the perception system of the robotic device includes a LIDAR sensor and a plurality of cameras, wherein the control system is further configured to:
receive, from the LIDAR sensor and the plurality of cameras, environmental data;
based on the environmental data, determine a tracker state representing current environmental information, wherein the tracker state is also inputted into the machine learning model, wherein the training data includes a plurality of tracker states, wherein the machine learning model has been trained using the training data including the plurality of tracker states.

19. The robotic device of claim 17, wherein the control system is further configured to:
- determine staleness measurements corresponding to past environmental data, wherein the staleness measurements and the corresponding past environmental data are also inputted into the machine learning model, wherein the training data includes a plurality of staleness measurements and a plurality of past environmental data and the machine learning model has been trained using the training data including the plurality of staleness measurements and the plurality of past environmental data.

20. A non-transitory computer readable medium comprising program instructions executable by at least one processor to cause the at least one processor to perform functions comprising:
- determining, for a robotic device that comprises a perception system, a robot planner state representing at least one future path for the robotic device in an environment, wherein the perception system is independently controllable to move relative to the robotic device to view the environment from different perspectives;
- determining a perception system trajectory by inputting at least the robot planner state into a machine learning model trained based on training data comprising at least a plurality of robot planner states and a corresponding plurality of operator-directed perception system trajectories, wherein each of the operator-directed perception system trajectories is based on operator-generated instructions for control of a respective perception system relative to a respective robotic device for the corresponding robot planner state, and wherein the perception system trajectory comprises a trajectory through which to move the perception system relative to the robotic device; and
- controlling the perception system to move through the determined perception system trajectory relative to the robotic device.

* * * * *